United States Patent
Goodwin, III et al.

(10) Patent No.: US 6,360,207 B1
(45) Date of Patent: Mar. 19, 2002

(54) SYSTEM AND METHOD OF CONSOLIDATING INFORMATION FOR DISPLAY BY ELECTRONIC PRICE LABELS

(75) Inventors: John C. Goodwin, III, Suwanee; Terry L. Zimmerman, Lawrenceville, both of GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/274,411

(22) Filed: Mar. 23, 1999

(51) Int. Cl.[7] ........................ G06F 17/60; G06F 13/00
(52) U.S. Cl. .................. 705/20; 345/520; 340/825.52
(58) Field of Search ..................... 705/20; 345/520; 340/825.52

(56) References Cited

U.S. PATENT DOCUMENTS

| | | | |
|---|---|---|---|
| 4,500,880 A | 2/1985 | Gomersall et al. | 340/825.35 |
| 4,924,363 A | 5/1990 | Kornelson | 362/125 |
| 5,172,314 A | 12/1992 | Poland et al. | 364/401 |
| 5,448,226 A | 9/1995 | Failing, Jr. et al. | 340/825.35 |
| 5,943,654 A * | 8/1999 | Goodwin, III et al. | 705/20 |
| 6,021,395 A * | 2/2000 | Goodwin, III et al. | 705/20 |
| 6,047,263 A * | 4/2000 | Goodwin, III et al. | 705/20 |
| 6,173,268 B1 * | 1/2001 | Goodwin, III | 705/20 |
| 6,243,690 B1 * | 6/2001 | Adamec | 705/20 |

FOREIGN PATENT DOCUMENTS

| | | | |
|---|---|---|---|
| EP | 0 749 092 A2 * | 12/1996 | 705/20 |
| EP | 0 874 324 A2 * | 10/1998 | 705/20 |

OTHER PUBLICATIONS

Dayton, Leigh, New Scientist, Apr. 25, 1992, vol. 134, No. 1818, p. 19.*

* cited by examiner

Primary Examiner—Robert P. Olszewski
Assistant Examiner—Bryan Jaketic
(74) Attorney, Agent, or Firm—Paul W. Martin

(57) ABSTRACT

A system and method of consolidating information for display which relies on codes. The system includes a database including a plurality of types of information besides price to be displayed by an electronic price label and a computer. The computer schedules messages for transmission to the electronic price label, including a message containing the information. The computer identifies a number of the types of information to be displayed by the electronic price label, obtains the number of the types of information from the database, determines parameters for storing and displaying the number of types of information, and creates a code incorporating the number of types of information and the parameters for storing and displaying the number of types of information.

13 Claims, 4 Drawing Sheets

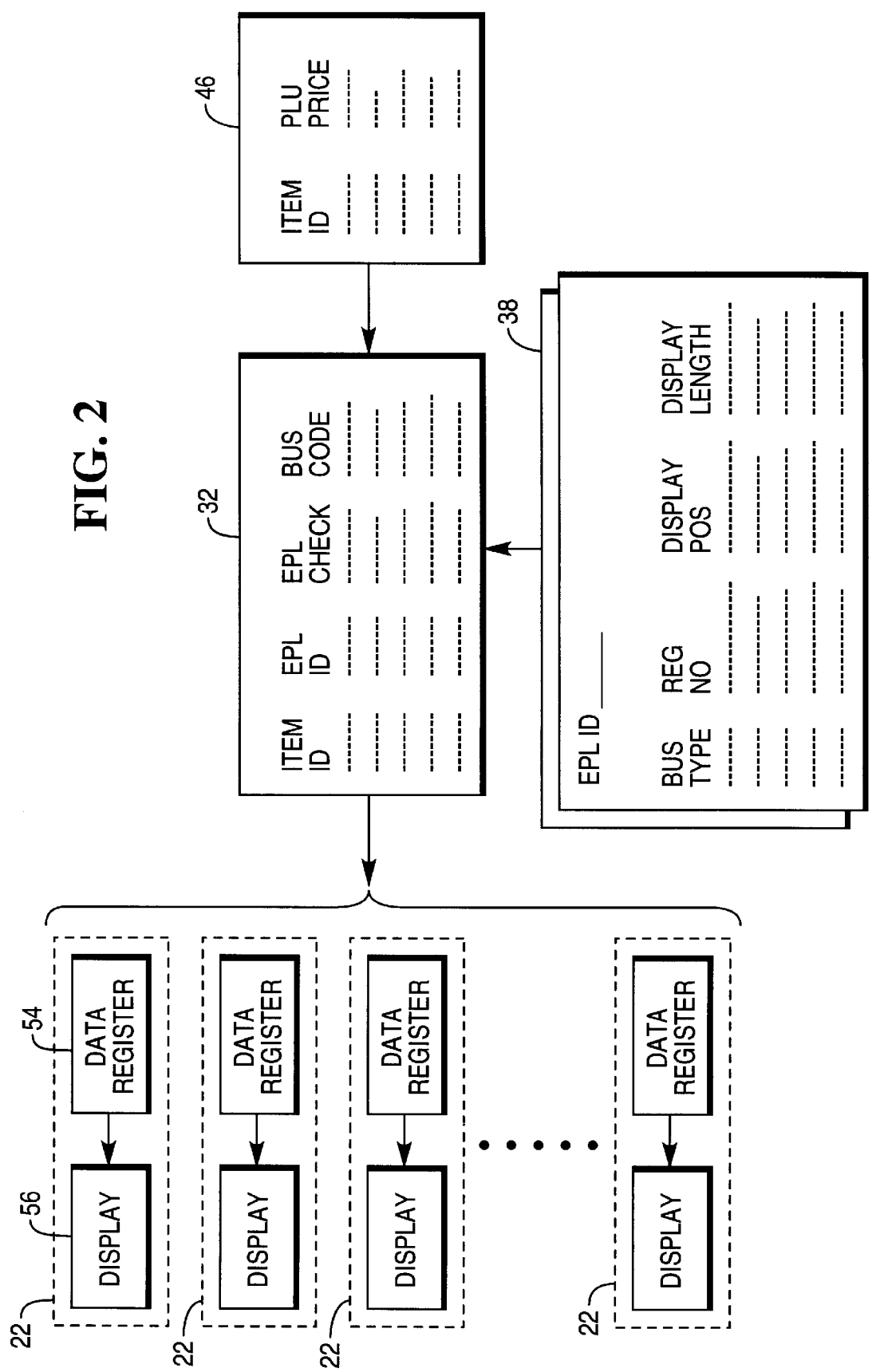

SYSTEM AND METHOD OF CONSOLIDATING INFORMATION FOR DISPLAY BY ELECTRONIC PRICE LABELS

BACKGROUND OF THE INVENTION

The present invention relates to electronic price label (EPL) systems, and more specifically to a system and method of consolidating information for display by EPLs.

EPL systems typically include a plurality of EPLs for merchandise items in a transaction establishment. EPLs typically display the prices of corresponding merchandise items on store shelves and are typically attached to a rail along the leading edge of the shelves. A transaction establishment may contain thousands of EPLs to display the prices of the merchandise items. The EPLs are coupled to a central server from where information about the EPLs is typically maintained in an EPL data file. Price information displayed by the EPLs is obtained from a price look-up (PLU) data file and stored within an EPL price change record.

EPLs are typically used to display more than price information. The additional information may include promotional information and information to assist in managing the transaction establishment, such as inventory information, shelf talker type, average item movement, number of facings for an item, plan-o-gram compliance information, and re-order information. However, EPLs have limited storage and display capabilities.

Therefore, it would be desirable to provide a system and method of consolidating information for display by EPLs.

SUMMARY OF THE INVENTION

In accordance with the teachings of the present invention, a system and method of consolidating information for display by electronic price labels (EPLS) is provided.

A system and method of consolidating information for display which relies on codes. The system includes a database including a plurality of types of information besides price to be displayed by an electronic price label and a computer. The computer schedules messages for transmission to the electronic price label, including a message containing the information. The computer identifies a number of the types of information to be displayed by the electronic price label, obtains the number of the types of information from the database, determines parameters for storing and displaying the number of types of information, and creates a code incorporating the number of types of information and the parameters for storing and displaying the number of types of information.

A method of consolidating information for display by an electronic price label includes identifying a number of types of information to be displayed, obtaining the number of types of information from a data file, determining parameters for storing and displaying the number of types of information, and creating a code incorporating the number of types of information and the parameters for storing and displaying the number of types of information.

It is accordingly an object of the present invention to provide a system and method of consolidating information for display by EPLs.

It is another object of the present invention to provide a system and method of displaying employee-directed business information without disrupting the display of price and/or promotional information by an EPL.

It is another object of the present invention to provide a system and method of displaying as much employee-directed business information as possible using a condensed format.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 2 is a diagram showing data files used within the transaction processing system;

DETAILED DESCRIPTION OF THE PREFERRED EMBODIMENT

Figure 1:
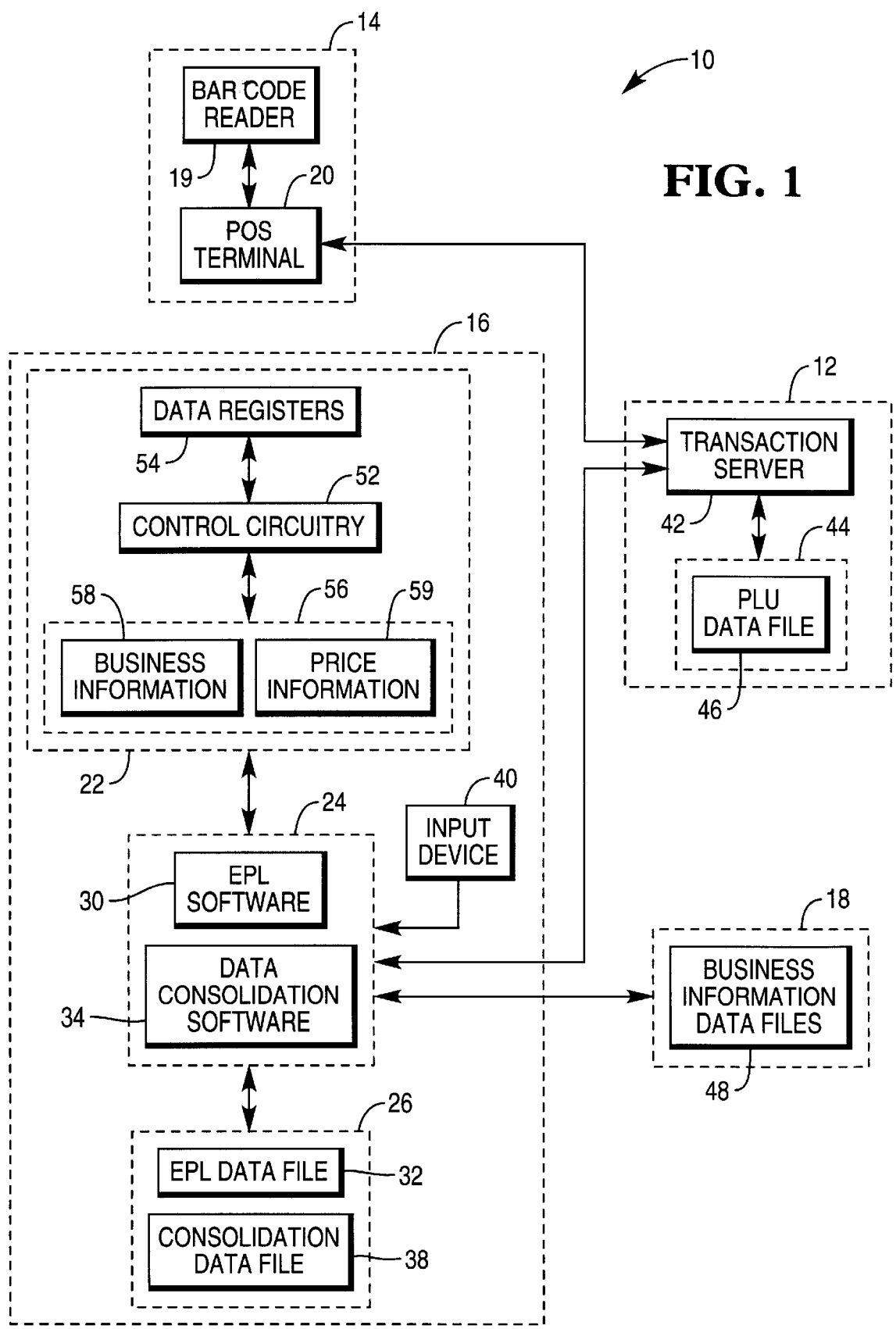
FIG. 1 is a block diagram of a transaction processing system.

Referring now to FIG. 1, transaction processing system 10 primarily includes host computer system 12, point-of-sale (POS) system 14, EPL system 16, and business information systems 18. Here, components 12, 14, 16, and 18 are shown as separate components that are networked together, but they may also be combined in different ways to form less components. Thus, host computer system 12 may be a POS terminal which doubles as a host computer for network of other POS terminals. Also, host computer system 12 and business information systems 18 may be combined into a single system.

POS system 14 includes bar code reader 19 and terminal 20.

EPL system 16 primarily includes EPLS 22, host EPL terminal 24, and EPL storage medium 26.

EPLs 22 include control circuitry 52, data registers 54 and displays 56.

Control circuitry 52 receives and transmits messages from EPL terminal 24 and controls display of information by display 56. Control circuitry 52 stores data within the messages, such as price, promotional, and business information, in data registers 54.

Business information is employee-directed information which is of primary interest to employees, rather than customers. Business information may be displayed alone, or in combination with price information. In the latter case, business information is displayed in portion 58 while price information is displayed in second portion 59. Both types of information may be in separate registers and/or may be combined into a single data message prior to transmission to EPL 22.

Host EPL terminal 24 executes EPL software 30. To assist with execution of certain tasks performed by EPL software 30, EPL terminal 24 includes a built-in time keeping device, commonly referred to as a system clock, which is synchronized with current time, in order to automatically execute the tasks at their scheduled times.

EPL software 30 is responsible for scheduling and transmitting data to EPLS 22. EPL software 30 obtains prices in price look-up (PLU) data file 46 as they are entered in input device 40 or after they have been stored within PLU data file 46.

EPL storage medium 26 stores EPL data file 32 and consolidation data file 38. EPL storage medium 26 is preferably a fixed disk drive.

EPL data file 32 contains EPL identification and checksum information. Checksum information is calculated from price information in PLU data file 46. EPL data file 32 contains current information displayed by EPLs 22.

Input device 40 is preferably a keyboard.

Host computer system 12 includes PLU storage medium 44, and transaction server 42.

Transaction server 42 handles price requests from POS terminal 20. POS terminal 20 sends item identification information to transaction server 42 and transaction server 42 returns the corresponding price from PLU data file 46.

PLU storage medium 44 stores PLU data file 46. PLU data file 46 is available for distribution to POS terminal 20. Provision may be made for direct access to PLU data file 46 by bar code reader 19.

Business information systems 18 include information sources and associated business information data files 48. Business information systems 18 maintain information for managing the transaction establishment, such as inventory information, shelf talker type, average item movement, number of facings for an item, plan-o-gram compliance information, and re-order information. Business information data file 48 may be a database, data warehouse, plan-o-gram database, in-store data file, or other source of business information. Business information in business information data files 48 is available for distribution to EPL system 16.

Turning now to FIG. 2, EPL data file 32, PLU data file 46, and consolidation data file 38 are shown in more detail.

EPL data file 32 includes a line entry for each EPL 22 in EPL system 16. Each line entry should have an item identification entry (ITEM ID), an EPL identification entry (EPL ID), an EPL checksum value entry (EPL CHECK), and a business information entry (BUS CODE).

Entry ITEM ID identifies a store item. Entry EPL ID identifies which EPL is assigned to the item. Entry EPL CHECK is a checksum value of the digits of the price information that is displayed by display 56. Entry BUS CODE is a code containing business information to be displayed by EPL 22 and storage information for storing the business information.

PLU data file 46 includes a line entry for each item sold in the transaction establishment. Each line entry has at least an item identification entry (ITEM ID) and a PLU price entry (PLU PRICE).

Entry ITEM ID identifies a store item. Entry PLU PRICE identifies the price read by POS system 14 to determine the price of each item during scanning by bar code reader 19.

Consolidation data file 38 preferably includes a record for each EPL (EPL ID) in the transaction establishment, although some stores may desire fewer records. Each line entry in the record includes a business information type entry (BUS TYPE), a data register number entry (REG NO), a display position entry (DISPLAY POS), and a display length (DISPLAY LENGTH).

Entry BUS TYPE identifies the source or sources of business information to be coded and displayed. For example, business information types (BUS TYPE) may include inventory information, shelf talker placement information, average item movement information, number of facings for an item, plan-o-gram compliance information, and re-order information.

Entry REG NO identifies the number of the data register in which the business information will be stored. Entry DISPLAY POS identifies the position of the business information in the display. Entry DISPLAY LENGTH identifies the length of the business information, including a preceding space as necessary to separate it from another type of business information in a previous position.

Business information data files 48 are sources of different types of business information. Each business information data file 48 typically includes line entries for ms sold in the transaction establishment (ITEM ID) and business information (BUS INFO).

For example, one type of business information data file could be an inventory data file containing latest inventory information about merchandise items sold in a transaction establishment.

During normal operation, data consolidation software 34 creates entry BUS CODE from configuration information in consolidation data file 38 and business information in business information data files 48. Data consolidation software 34 obtains business information types for an EPL 22 from consolidation data file 38. Data consolidation software 34 then obtains business information from business information data files 48 identified in the BUS TYPE entries for the EPL 22. After retrieving the business information, data consolidation software 34 consolidates the business and configuration information into a business information code (BUS CODE).

For example, an operator may add the following line entries to an EPL record in consolidation data file 38:

| BUS TYPE | REG NO | DISPLAY POS | DISPLAY LENGTH |
|---|---|---|---|
| BIB | 4 | 1 | 1 |
| INVL | 4 | 2 | 3 |
| MVMT | 4 | 5 | 4 |

Where the "BIB" value is "0" if a shelf talker is not installed and "1" if a shelf talker is installed, the "INVL" value is a current inventory level for the item associated with EPL 22, and the "MVMT" value is the average movement value for the item. If data consolidation software 34 determines from consolidation data files 66 that BIB=0,INVL=50, and MVMT=945, then data consolidation software 34 consolidates the above information into a business code entry in EPL data file 32 of "1 50 945". Data consolidation software 34 then causes EPL software 30 to schedule a message for transmission to EPL 22 which contains the business information code and a command to store and display the encoded business information.

Control circuitry 52 within EPL 22 receives the message, decodes the business information code, stores the business information in the data register 54 identified in the business information code, and causes display 56 to display the business information in portion 58 in accordance with display position and length information in the business information code.

Figure 3A:
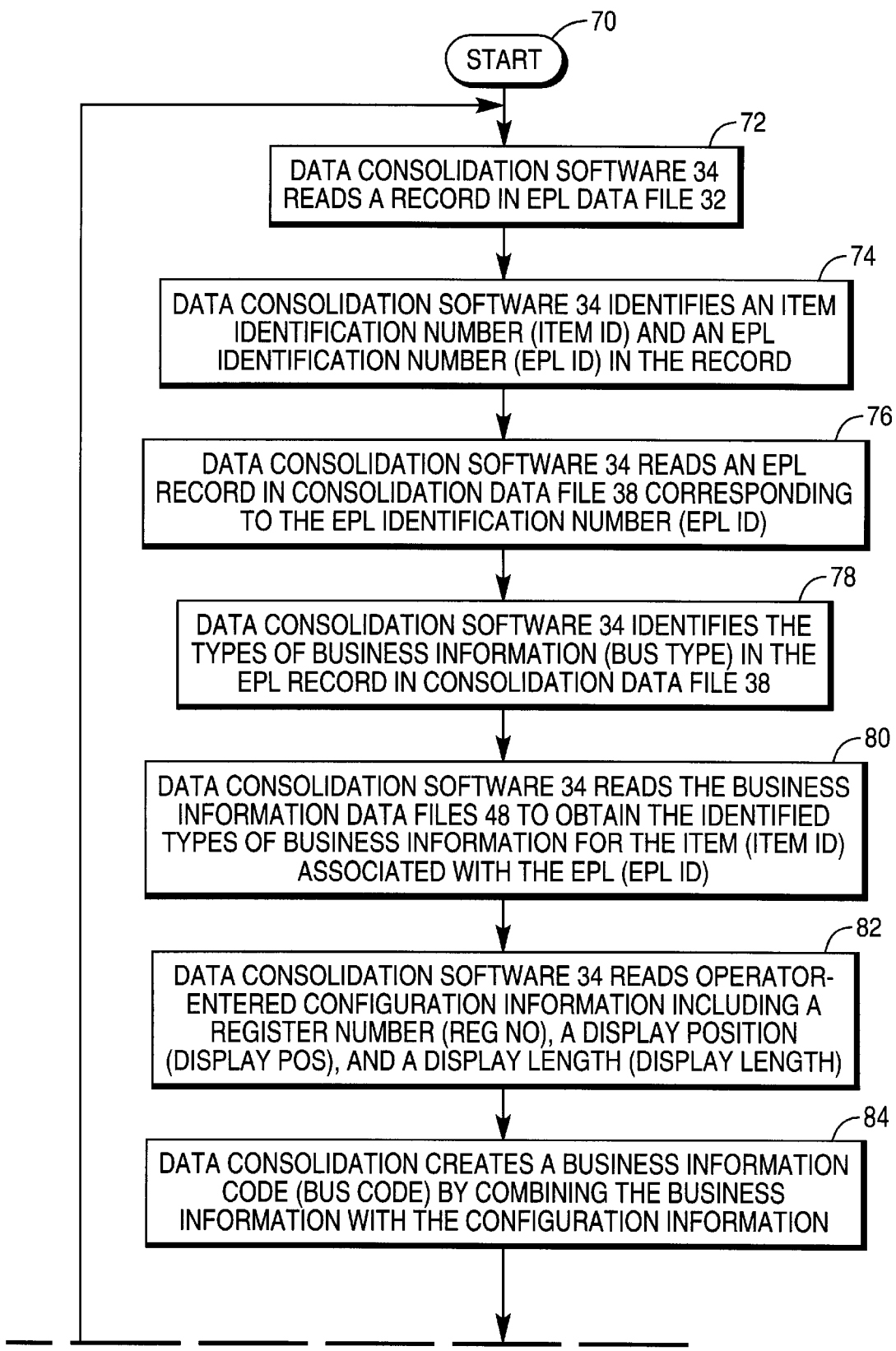
FIG. 3 is a flow diagram illustrating the method of the present invention.
Figure 3B:
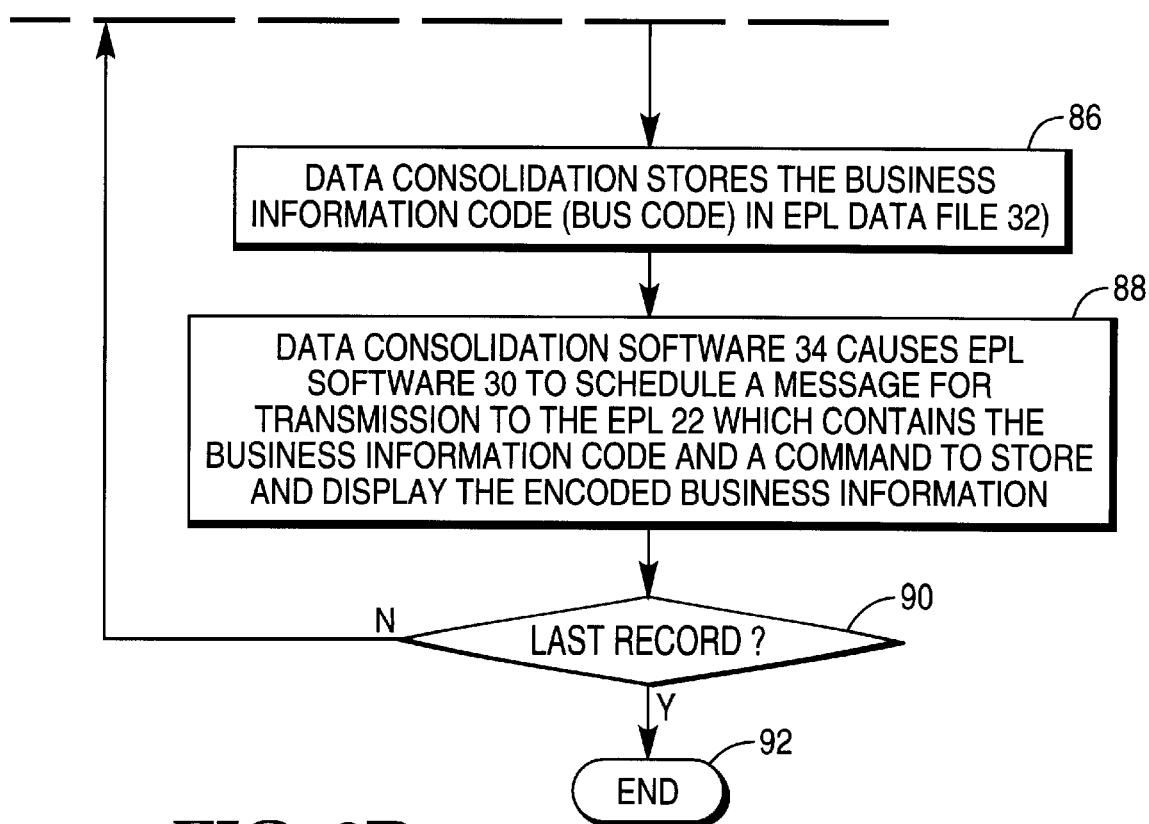

Referring now to FIG. 3, the operation of data consolidation software is illustrated in detail, beginning with START 70.

In step 72, data consolidation software 34 reads a record in EPL data file 32.

In step 74, data consolidation software 34 identifies an item identification number (ITEM ID) and an EPL identification number (EPL ID) in the record.

In step 76, data consolidation software 34 reads an EPL record in consolidation data file 38 corresponding to the EPL identification number (EPL ID).

In step 78, data consolidation software 34 identifies the types of business information (BUS TYPE) in the EPL record in consolidation data file 38.

In step 80, data consolidation software 34 reads the business information data files 48 to obtain the identified types of business information for the item (ITEM ID) associated with the EPL (EPL ID).

In step 82, data consolidation software 34 reads operator-entered configuration information including a register number (REG NO), a display position (DISPLAY POS), and a display length (DISPLAY LENGTH).

In step 84, data consolidation creates a business information code (BUS CODE) by combining the business information with the configuration information.

In step 86, data consolidation stores the business information code (BUS CODE) in EPL data file 32.

In step 88, data consolidation software 34 causes EPL software 30 to schedule a message for transmission to the EPL 22 which contains the business information code and a command to store and display the encoded business information.

Control circuitry 52 within EPL 22 receives the message, decodes the business information code, stores the business information in the data register 54 identified in the business information code, and causes display 56 to display the business information in portion 58 in accordance with display position and length information in the business information code. To the extent that EPL 22 was storing and displaying other information in the data register 54 and display portion 58, EPL 22 ceases storing and displaying the other information. Communication bandwidth may be conserved by updating only one register with multiple pieces of information.

In step 90, data consolidation software 34 determines whether the record is the last record in EPL data file 32. If not, operation returns to step 72. If so, operation ends at step 92.

Advantageously, the present invention efficiently displays helpful business information while minimizing storage and display area requirements in EPLs. The present invention allows several pieces of business information to be displayed without disrupting the display of price information by the EPLs.

Although the present invention has been described with particular reference to certain preferred embodiments thereof, variations and modifications of the present invention can be effected within the spirit and scope of the following claims.

What is claimed is:

1. A method of consolidating information for display by an electronic price label comprising:
   (a) identifying a number of types of information to be displayed;
   (b) obtaining the number of types of information from a data file;
   (c) determining parameters for storing and displaying the number of types of information; and
   (d) creating a code incorporating the number of types of information and the parameters for storing and displaying the number of types of information.

2. The method as recited in claim 1, wherein (a) comprises:
   (a-1) associating the types of information with the electronic price label in a data record; and
   (a-2) reading the data record for the electronic price label to obtain designators for the types of information.

3. The method as recited in claim 1, wherein (c) comprises:
   (c-1) determining a memory register for storing the number of types of information; and
   (c-2) determining a display position and length for the number of types of information.

4. The method as recited in claim 1, wherein (c) comprises:
   (c-1) recording the parameters from operator input.

5. The method as recited in claim 1, wherein the number of types of information comprises business information which is only of interest to employees of a transaction establishment in which the electronic price label is located.

6. A method of consolidating information for display by an electronic price label comprising:
   (a) storing a plurality of types of information including a number of types of information to be displayed in a data file;
   (b) storing designators identifying the number of types of information to be displayed in a data record associated with the electronic price label; and
   (c) creating a message to the electronic price label including
      (c-1) reading the data record to determine the designators;
      (c-2) reading the data file to determine the number of types of information associated with the designators;
      (c-3) recording a memory register location parameter, a display position parameter, and a display length parameter from operator input;
      (c-4) creating a code incorporating the number of types of information and the parameters.

7. A method of displaying information by an electronic price label comprising:
   (a) identifying a number of types of information to be displayed;
   (b) obtaining the number of types of information from a data file;
   (c) determining parameters for storing and displaying the number of types of information;
   (d) creating a code incorporating the number of types of information and the parameters for storing and displaying the number of types of information;
   (e) sending the code to the electronic price label;
   (f) decoding the code by the electronic price label;
   (g) storing the number of types of information by the electronic price label in accordance with the parameters; and
   (h) displaying the information by the electronic price label in accordance with the parameters.

8. A method of displaying information by an electronic price label comprising:
   (a) storing a plurality of types of information including a number of types of information to be displayed in a data file;
   (b) storing designators identifying the number of types of information to be displayed in a data record associated with the electronic price label;
   (c) creating a message to the electronic price label including
      (c-1) reading the data record to determine the designators;
      (c-2) reading the data file to determine the number of types of information associated with the designators;
      (c-3) recording a memory register location parameter, a display position parameter, and a display length parameter from operator input;
      (c-4) creating a code incorporating the number of types of information and the parameters;
   (d) sending the code to the electronic price label;
   (f) decoding the code by the electronic price label;
   (g) storing the number of types of information by the electronic price label in accordance with the parameters; and (h) displaying the number of types of information by the electronic price label in accordance with the parameters.

9. A method of displaying information by an electronic price label comprising:

(a) sending price information to the electronic price label;

(b) displaying the price information by the electronic price label;

(c) identifying a number of types of information other than price information to be displayed;

(d) obtaining the number of types of information from a data file;

(e) determining parameters for storing and displaying the number of types of information;

(f) creating a code incorporating the number of types of information and the parameters for storing and displaying the number of types of information;

(g) sending the code to the electronic price label;

(h) decoding the code by the electronic price label;

(i) storing the number of types of information by the electronic price label in accordance with the parameters; and (j) displaying the information by the electronic price label in accordance with the parameters.

10. A method of displaying information by an electronic price label comprising:

(a) sending price and promotional information to the electronic price label;

(b) displaying the price and promotional information by the electronic price label;

(c) identifying a number of types of employee-directed information to be displayed;

(d) obtaining the number of types of employee-directed information from a data file;

(e) determining parameters for storing and displaying the number of types of employee-directed information;

(f) creating a code incorporating the number of types of employee-directed information and the parameters for storing and displaying the number of types of employee-directed information;

(g) sending the code to the electronic price label;

(h) decoding the code by the electronic price label;

(i) storing the number of types of employee-directed information by the electronic price label in accordance with the parameters; and (j) displaying the number of types of employee-directed information by the electronic price label in accordance with the parameters.

11. The method as recited in claim 10, further comprising:

(k) ceasing display of the promotional information by the electronic price label prior to displaying the number of types of employee-directed information.

12. A system for consolidating information for display by an electronic price label comprising:

a database including a plurality of types of information besides price to be displayed by an electronic price label; and a computer for scheduling messages for transmission to the electronic price label, including a message containing the information, wherein the computer identifies a number of the types of information to be displayed by the electronic price label, obtains the number of the types of information from the database, determines parameters for storing and displaying the number of types of information, and creates a code incorporating the number of types of information and the parameters for storing and displaying the number of types of information.

13. An electronic price label system comprising:

an electronic price label;

a database including a plurality of types of information besides price to be displayed by the electronic price label; and a computer for scheduling messages for transmission to the electronic price label, including a message containing the information, wherein the computer identifies a number of the types of information to be displayed by the electronic price label, obtains the number of the types of information from the database, determines parameters for storing and displaying the number of types of information, and creates a code incorporating the number of types of information and the parameters for storing and displaying the number of types of information;

wherein the electronic price label decodes the code, stores the number of types of information in accordance with the parameters, and displays the number of types of information in accordance with the parameters.

* * * * *